US012555714B2

(12) United States Patent
Ning et al.

(10) Patent No.: US 12,555,714 B2
(45) Date of Patent: Feb. 17, 2026

(54) DEVICE, METHOD, AND SYSTEM TO PROVIDE PASSIVATION STRUCTURES OF A MAGNETIC MATERIAL BASED INDUCTOR

(71) Applicant: Intel Corporation, Santa Clara, CA (US)

(72) Inventors: Xin Ning, Gilbert, AZ (US); Kyu-oh Lee, Chandler, AZ (US); Brent Williams, Chandler, AZ (US); Brandon C. Marin, Gilbert, AZ (US); Tarek A. Ibrahim, Mesa, AZ (US); Krishna Bharath, Chandler, AZ (US); Sai Vadlamani, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 1062 days.

(21) Appl. No.: 17/352,952

(22) Filed: Jun. 21, 2021

(65) Prior Publication Data

US 2022/0406512 A1 Dec. 22, 2022

(51) Int. Cl.
*H01F 27/255* (2006.01)
*H01F 27/28* (2006.01)
(Continued)

(52) U.S. Cl.
CPC ....... *H01F 27/255* (2013.01); *H01F 27/2804* (2013.01); *H01F 27/29* (2013.01); *H01F 41/0246* (2013.01); *H01F 41/041* (2013.01)

(58) Field of Classification Search
CPC .... H01F 27/255; H01F 27/2804; H01F 27/29; H01F 41/0246; H01F 41/041;
(Continued)

(56) References Cited

U.S. PATENT DOCUMENTS 5,166,845 A * 11/1992 Thompson ............. G11B 5/484 360/234.6
10,306,760 B2 5/2019 Li et al.
(Continued)

FOREIGN PATENT DOCUMENTS

WO 2019066868 4/2019
WO WO-2019066868 A1 * 4/2019 ......... H01F 17/0013

OTHER PUBLICATIONS

Extended European Search Report for EP Patent Application No. 22162034.7 dated Oct. 12, 2022.
(Continued)

*Primary Examiner* — William B Partridge
*Assistant Examiner* — Linda J. Fleck
(74) *Attorney, Agent, or Firm* — Essential Patents Group, LLP

(57) ABSTRACT

Techniques and mechanisms for providing structures of a magnetic material based inductor. In an embodiment, an inductor comprises a body of a magnetic material, and a conductor which extends along a surface of the body. The body comprises a carrier material and magnetic filler particles distributed in the carrier material. A passivation material of the inductor is provided adjacent to the conductor and to surfaces of the filler particles. The conductor and the passivation material comprise different respective material compositions, wherein the passivation material comprises one of nickel, tin, copper, palladium, or gold. In another embodiment, the inductor is one of a plated through hole inductor type of a planar inductor type.

15 Claims, 11 Drawing Sheets

(51) Int. Cl.
*H01F 27/29* (2006.01)
*H01F 41/02* (2006.01)
*H01F 41/04* (2006.01)

(58) Field of Classification Search
CPC ......... H01F 2017/002; H01F 2017/048; H01F 2017/065; H01F 2017/0006; H01L 25/0657; H01L 2225/06513
See application file for complete search history.

(56) References Cited

U.S. PATENT DOCUMENTS

| | | | | |
|---|---|---|---|---|
| 2009/0027948 | A1* | 1/2009 | Ruehrig | G11C 11/16 365/158 |
| 2011/0204517 | A1* | 8/2011 | Gu | H01L 23/481 438/653 |
| 2017/0064837 | A1* | 3/2017 | Li | H01L 21/4857 |
| 2017/0229533 | A1* | 8/2017 | Deligianni | H01F 1/04 |
| 2019/0206597 | A1 | 7/2019 | Brown et al. | |
| 2019/0221345 | A1 | 7/2019 | Vadlamani et al. | |
| 2019/0252102 | A1 | 8/2019 | Marin et al. | |
| 2019/0272936 | A1 | 9/2019 | Zhang et al. | |
| 2019/0279806 | A1* | 9/2019 | Darmawikarta | H01F 27/2804 |
| 2019/0287815 | A1 | 9/2019 | Xu et al. | |
| 2019/0355675 | A1 | 11/2019 | Lee et al. | |
| 2019/0385780 | A1 | 12/2019 | Xu et al. | |
| 2020/0006239 | A1 | 1/2020 | Zhang et al. | |
| 2020/0066634 | A1 | 2/2020 | Do et al. | |
| 2020/0066830 | A1 | 2/2020 | Bharath et al. | |
| 2020/0098621 | A1 | 3/2020 | Bharath et al. | |
| 2020/0258975 | A1* | 8/2020 | Shanmugam | H01L 21/486 |
| 2021/0098436 | A1 | 4/2021 | Bharath et al. | |
| 2024/0371787 | A1* | 11/2024 | Hsieh | H01L 23/49827 |

OTHER PUBLICATIONS

Notice of Allowance from European Patent Application No. 22162034.7 notified Sep. 2, 2025, 7 pgs.

* cited by examiner

DEVICE, METHOD, AND SYSTEM TO PROVIDE PASSIVATION STRUCTURES OF A MAGNETIC MATERIAL BASED INDUCTOR

BACKGROUND

1. Technical Field

This disclosure generally relates to magnetic material based inductors and more particularly, but not exclusively, to passivation structures which facilitate the fabrication of an inductor.

2. Background Art

Conventional processors with integrated voltage regulation (IVR) schemes, such as FIVR (fully integrated voltage regulator), typically use package embedded air core inductors (ACIs). Fully integrated voltage regulators (FIVRs) enable the provisioning of power delivery characteristics which are specific to a particular domain. However, FIVR performance is often constrained by power efficiency issues, or is sensitive to the package dimension and process variation. With Moore's law scaling, the footprint available for inductors reduces every generation, leading to a decline in the quality factor (Q factor) of ACI inductors, increased IVR losses, and reduced efficiency.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1A:
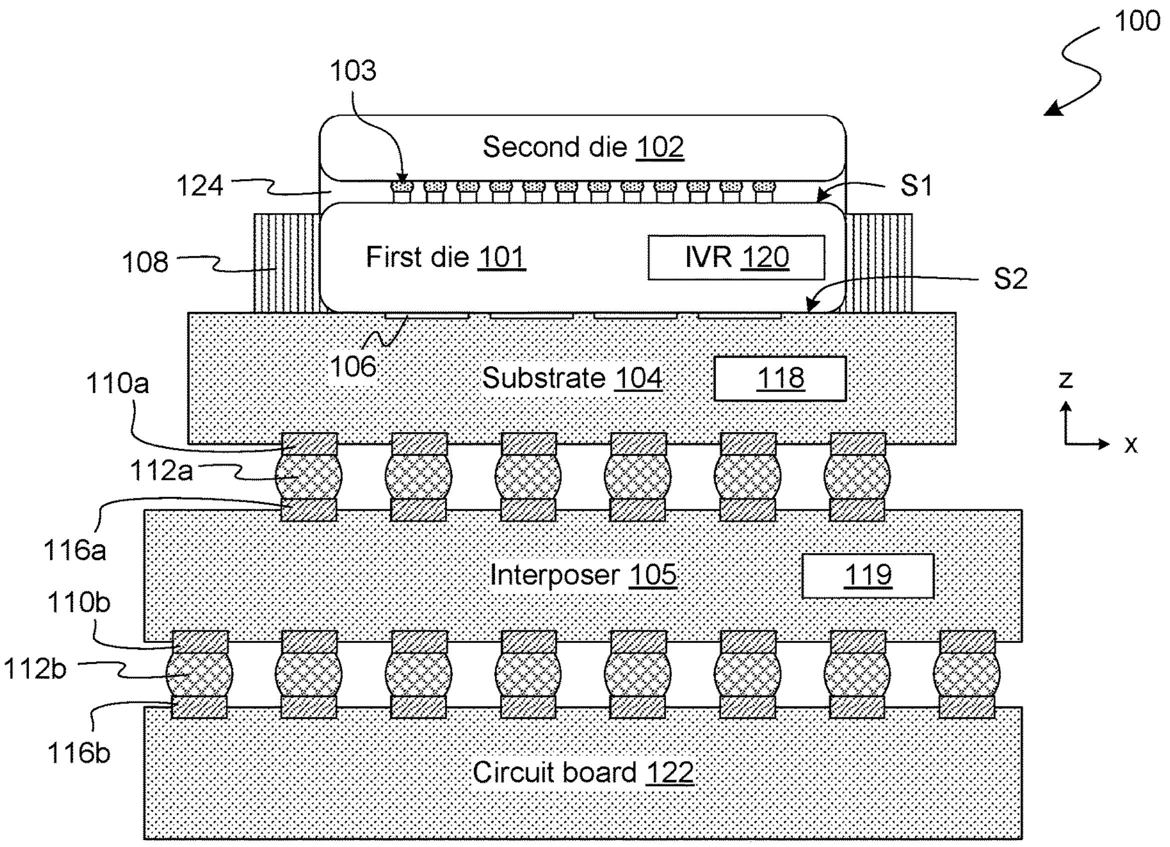
FIG. 1A illustrates a cross-section of package with a magnetic material based inductor, according to some embodiments of the disclosure.

Embodiments discussed herein variously provide techniques and mechanisms for a passivation material to facilitate the fabrication of a magnetic material based inductor which comprises a magnetic based material in or on a substrate. In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including an inductor comprising a magnetic material, a conductor, and a passivation material disposed therebetween.

Some existing technologies integrate magnetic core materials in a package to improve inductance, flux and/or power delivery characteristics. For example, various iron alloy based magnetic core materials exhibit low magnetic loss and high permeability characteristics which make them attractive for many applications. Some embodiments variously improve on these existing technologies by mitigating a tendency of iron alloy fillers (for example) to pose material compatibility problems—e.g., with respect to wet chemistry manufacturing processes such as desmear, eless Cu seed, copper roughening and subtractive processes. Examples of such problems include a risk of leaching in an acid clean/eless Cu bath, an unacceptably high reactivity in a soft etching module, poor coverage and/or discontinuity of a conductive layer formed by eless copper (Cu)—or other—deposition, or the like.

Certain features of various embodiments are described herein with reference to the providing of a passivation material between a magnetic material and a conductor, wherein the passivation material, magnetic material and conductor—respectively—comprise nickel (Ni), iron (Fe), and copper (Cu). However, with the benefit of the information provided herein, it is to be appreciated by one of ordinary skill in the art that such description can be extended to additionally or alternatively apply to any of various other suitable combinations of a passivation material, a magnetic material, and a conductor.

FIG. 1A illustrates a cross-section of a packaged device 100 with one or more magnetic material based inductors, according to some embodiments. Device 100 illustrates one example of an embodiment wherein an inductor comprises a passivation layer which adjoins a conductor and a first body of a magnetic material—e.g., wherein the magnetic material comprises both a carrier material, and magnetic filler particles in said carrier material. In one such embodiment, packaged device 100 comprises a type of inductor—referred to herein as a plated through-hole (PTH) inductor—in which a conductor extends into a hole formed with a magnetic material. Additionally or alternatively, packaged device 100 comprises another type of inductor—referred to herein as a planar inductor—in which a conductor extends, along a surface of a magnetic material, at a side of a substrate layer which the magnetic material forms at least in part.

In the example embodiment shown, packaged device 100 is, or otherwise includes, an IC (integrated circuit) package assembly comprising first die 101, package substrate 104, interposer 105, and circuit board 122. IC package device 100 illustrates a stacked die configuration wherein (in this example embodiment) first die 101 is coupled to package substrate 104, and second die 102 is coupled with first die 101. However, the particular arrangement of first die 101, second die 102, package substrate 104, interposer 105 and circuit board 122 relative to each other is merely illustrative, and not limiting on some embodiments. For example, various other embodiments omit some or all of first die 101, second die 102, or circuit board 122—e.g., wherein one such embodiment is provided only with a substrate (such as substrate 104 or that of interposer 105) which has formed therein or thereon inductor structures described herein.

In some embodiments, first die 101 has a first side S1 and a second side S2 opposite to the first side S1. In some embodiments, the first side S1 is the side of the die commonly referred to as the "inactive" or "back" side of the die. In some embodiments, the second side S2 includes one or more transistors, and is the side of the die commonly referred to as the "active" or "front" side of the die. In some embodiments, second side S2 of first die 101 includes one or more electrical routing features 106. In some embodiments, second die 102 includes an "active" or "front" side with one or more electrical routing features 606. In some embodiments, electrical routing features 106 are bond pads (e.g., formed from a combination of bumps and solder balls 103).

In some embodiments, second die 102 is coupled to first die 101 in a front-to-back configuration (e.g., the "front" or "active" side of second die 102 is coupled to the "back" or "inactive" side S1 of first die 101). In some embodiments, dies are coupled with one another in a front-to-front, back-to-back, or side-to-side arrangement. In some embodiments, one or more additional dies are coupled with first die 101, second die 102, and/or with package substrate 104. Other embodiments lack second die 102. In some embodiments, first die 101 includes one or more TSVs (through-silicon-vias). In some embodiments, second die 102 is coupled to first die 101 by die interconnects formed from combination of bumps and solder balls 103. In some embodiments, solder balls 103 are formed using a solder-on-die (SOD) process.

In some embodiments, inter-die interconnects are solder bumps, copper pillars, or other electrically conductive features. In some embodiments, an interface layer 124 is provided between first die 101 and second die 102. In some embodiments, interface layer 124 is, or includes, a layer of under-fill, adhesive, dielectric, or other material. In some embodiments, interface layer 124 serves various functions, such as providing mechanical strength, conductivity, heat dissipation, or adhesion.

In some embodiments, first die 101 and second die 102 are single dies (e.g., first die 101 is a single die instead of multiple dies). In other embodiments, first die 101 and/or second die 102 includes two or more dies. For example, in some embodiments first die 101 and/or second die 102 are a wafer (or portion of a wafer) having two or more dies formed on it. In some embodiments, first die 101 and/or second die 102 includes two or more dies embedded in an encapsulant. In some embodiments, the two or more dies are arranged side-by-side, vertically stacked, or positioned in any other suitable arrangement. In some embodiments, the IC package assembly includes, for example, combinations of flip-chip and wire-bonding techniques, interposers, multi-chip package configurations including system-on-chip (SoC) and/or package-on-package (PoP) configurations to route electrical signals.

In some embodiments, first die 101 and/or second die 102 are a primary logic die. In some embodiments, first die 101 and/or second die 102 are configured to function as memory, an application specific circuit (ASIC), a processor, or some combination of such functions. For example, first die 101 includes a processor and second die 102 includes memory. In some embodiments, one or both of first die 101 and second die 102 are embedded in encapsulant 108. In some embodiments, encapsulant 108 can be any suitable material, such as, liquid crystalline polymers, mold film, or ABF (Ajinomoto Build-up Film) substrate, other dielectric/organic materials, resins, epoxies, polymer adhesives, silicones, acrylics, polyimides, cyanate esters, thermoplastics, and/or thermosets.

In some embodiments, first die 101 is coupled to package substrate 104 (e.g., CPU substrate). In some embodiments, package substrate 104 is a coreless substrate. For example, package substrate 104 is a bumpless build-up layer (BBUL) assembly that includes a plurality of "bumpless" build-up layers. Here, the term "bumpless build-up layers" generally refers to layers of substrate and components embedded therein without the use of solder or other attaching means that are considered "bumps."

In some embodiments, the one or more build-up layers have material properties that are able to be altered and/or optimized for reliability, warpage reduction, etc. In some embodiments, package substrate 104 is composed of a polymer, ceramic, glass, or semiconductor material. In some embodiments, package substrate 104 is a conventional cored substrate and/or an interposer.

In some embodiments, interposer 105 is provided between circuit board 122 and substrate 104. Interposer 105 of the various embodiments is formed of a variety of materials. For example, interposer 105 is formed of an epoxy resin, a fiberglass-reinforced epoxy resin, a ceramic material, or a polymer material such as polyimide. In some embodiments, interposer 105 is formed of alternate rigid or flexible materials, such as silicon, germanium, and other group III-V and group IV materials of the Periodic Table. In some embodiments, interposer 105 includes metal interconnects and vias including but not limited to TSVs. In some embodiments, interposer 105 includes embedded devices including both passive and active devices. Such devices include, but are not limited to, capacitors, decoupling capacitors, resistors, inductors, fuses, diodes, transformers, sensors, ESD (electrostatic discharge diode) devices, and memory devices. In some embodiments, interposer 105 includes complex devices such as RF devices, power amplifiers, power management devices, antennas, arrays, sensors, and MEMS devices, etc. In some embodiments, package interconnects **112*a* couple electrical routing features 110*a* disposed on the second side of package substrate 104 to corresponding electrical routing features 116*a* on interposer 105**.

In some embodiments, circuit board (or motherboard) 122 is a PCB (printed circuit board) composed of an electrically insulating material such as an epoxy laminate. For example, circuit board 122 includes electrically insulating layers composed of materials such as, for example, polytetrafluoroethylene, phenolic cotton paper materials such as Flame Retardant 4 (FR-4), FR-1, cotton paper and epoxy materials such as CEM-1 or CEM-3, or woven glass materials that are laminated together using an epoxy resin prepreg material.

Structures such as traces, trenches, and vias (which are not shown here) are formed through the electrically insulating layers to route the electrical signals of first die 101 through the circuit board 122. Circuit board 122 is composed of other suitable materials in other embodiments. In some embodiments, circuit board 122 includes other electrical devices coupled to the circuit board that are configured to route electrical signals to or from first die 101 through circuit board 122. In some embodiments, circuit board 122 is a motherboard.

In some embodiments, a one side of interposer 105 is coupled to the second side of substrate 104 via routings **116*a*, 112*a*, and 110*a*. In some embodiments, another side of interposer 105 is coupled to circuit board 122 by package interconnects 110***b*, 112*b*, and 116*b*.

In some embodiments, package substrate 104 provides electrical routing features formed therein to route electrical signals between first die 101 (and/or the second die 102) and circuit board 122 and/or other electrical components external to the IC package assembly. In some embodiments, package interconnects 112*a/b* and die interconnects 106 include any of a wide variety of suitable structures and/or materials including, for example, bumps, pillars or balls formed using metals, alloys, solderable material, or their combinations. In some embodiments, electrical routing features 110 are arranged in a ball grid array ("BGA") or other configuration.

In some embodiments, a voltage regulator 120 (e.g., an integrated VR) is provided in first die 101 (or second die 102) which includes switching elements of the voltage regulator (e.g., high-side and low-side switches or bridges). In some embodiments, the relatively large low-loss switching elements placed in series with one or more inductors. In some embodiments, one or more PTH inductors and/or one or more planar inductors are fabricated in substrate 104, as shown by reference sign 118. Additionally or alternatively, one or more PTH inductors and/or one or more planar inductors are fabricated in interposer 105, as shown by reference sign 119.

In some embodiments, a control circuit disposed in the die stack (e.g., in first die 101 or second die 102) monitors the current demand placed on the voltage regulator 120 by one or more power consumers (e.g., by one or more rails coupled to a processor core). As the load (e.g., the load current demand) presented by the power consumer(s) increases, the control circuit conductively couples an inductor module (e.g., one or more magnetic inductors) while the high load condition exists. As the load decreases, the control circuit decouples the one or more inductors from the inductor module, freeing the one or more inductors for use by another power consumer.

In some embodiments, a power delivery system (e.g., for and in first and/or second dies 101/102) is provided that includes a plurality of power delivery circuits (e.g., power gates driven by voltage regulator 120), each of the circuits to supply a load current to a respective one of a plurality of conductively coupled loads (e.g., processor core, cache, graphics unit, memory, etc.); a plurality of magnetic inductor modules (e.g., 118/119), each of the plurality of inductor modules having a respective allowable current threshold, each of the plurality of inductor modules conductively coupled to a respective one of the power delivery circuits; and control circuitry to: receive information indicative of the load current supplied to at least one power delivery circuit; receive information indicative of the allowable current threshold of the at least one power delivery circuit; and determine whether the load current supplied by the at least one power delivery circuit exceeds the allowable current threshold for the inductor module conductively coupled to the at least one power delivery circuit.

In various embodiments, structures in or on a substrate are to provide an inductor comprising a passivation material which is deposited—e.g., via an electroless (eless) process—to facilitate a subsequent deposition of a conductor along a surface of a magnetic material. In one such embodiment, said deposition is to passivate magnetic filler particles which are in a carrier material—e.g., wherein a deposition comprising nickel (Ni) passivates particles of an iron (Fe) alloy and/or any of various other filler materials which (for example) are adapted from conventional inductor designs.

Immersion copper (Cu) deposition is one typical process to form a conductor on a magnetic material which (for example) comprises particles of an iron (Fe) filler. Such immersion processing tends to form copper sooner and/or more quickly on regions where the Fe filler is exposed, which poses issues of coverage uniformity and thickness control. Often, the reaction of such immersion Cu deposition is too fast to allow for control of uniformity and/or thickness. Additionally or alternatively, voids tend to be formed during volume change processes.

To improve such deposition of copper (and/or any of various other suitable conductors), some embodiments variously provide a passivation (protective) material on exposed surfaces of magnetic filler particles. In one such embodiments, this passivation material promotes a more steady reaction rate during metallization which deposits the conductor, thus improving the ability to control conductor thickness and/or continuity.

By way of illustration and not limitation, some embodiments provide an eless Ni plating layer on Fe filler particles to improve filler/eless Cu compatibility. In an embodiment, the eless Ni passivation is plated on exposed Fe fillers (e.g., only on said fillers due to the surface energy). Eless Ni coverage is facilitated, for example, by a selected chemistry of one or more precleaning Ni coating chemicals, of an eless Ni bath—e.g., with, or alternatively, without sulfur—to provide a desired Ni plating thickness. In some embodiments, eless Ni passivation mitigates the risk of Fe leaching and gas generation in subsequent processing such as an eless Cu bath, etching with bis-(3-sodiumsulfopropyl) disulfide (SPS), and/or an acid rinse bath with $H_2SO_4$. The eless Ni layer promotes adhesion of Ni to Fe fillers and eless Ni to eless Cu.

Some embodiments variously improve the stability and compatibility of Fe alloy (or other) magnetic materials in manufacturing processes by providing a protection eless Ni (or other suitable) layer with an auto catalytic reaction. In one such embodiment, a magnetic property of the eless Ni layer is determined (for example) by controlling a relative composition of nickel (Ni) with one or more other constituents in an eless bath. By way of illustration and not limitation, a Ni—P ratio of such an eless bath is selectively provided in some embodiments to mitigate skin effect loss.

Figure 1B:
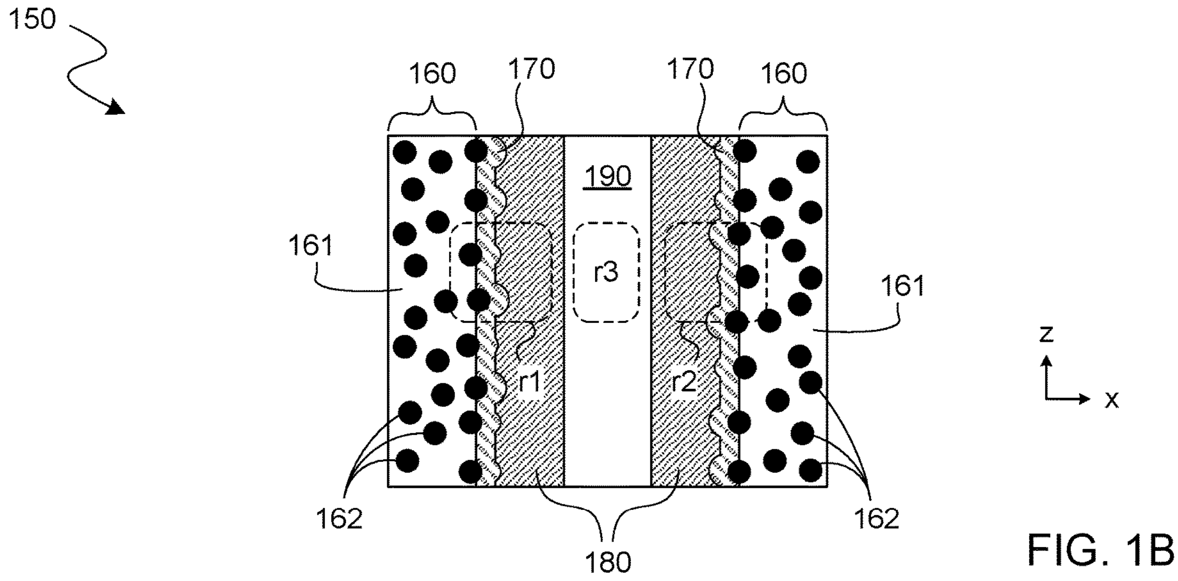
FIG. 1B illustrates a cross-section a magnetic material based inductor comprising a passivation material, according to some embodiments of the disclosure.

For example, FIG. 1B shows a cross-sectional side view of a portion of an inductor 150 which, in various embodiments, is provided in a substrate such as one at device 100. Inductor 150 illustrates a PTH inductor which includes a passivation material according to one embodiment. As described elsewhere herein, some embodiments additionally or alternatively provide a planar inductor comprising said passivation material.

In the example embodiment shown, inductor 150 comprises a body 160 (i.e., a contiguous mass) in a substrate, such as that of interposer 105, or such as package substrate 104, for example. Body 160 exhibits magnetic characteristics which facilitate operation of inductor 150—e.g., wherein body 160 comprises a carrier material 161, and magnetic filler particles 162 which are in carrier material 161. In one such embodiment, carrier material 161 comprises an epoxy, a rubber, a ceramic, a polymer resin—e.g., comprising anhydride modified polyethylene (AMP)—and/or any of various other materials which are suitable to support a distribution of filler particles 162 in body 160.

In various embodiments, filler particles 162 exhibit magnetic properties and (for example) comprise one of a paramagnet or a ferromagnet. In one such embodiment, filler particles 162 comprise one of iron, nickel, zinc, or silicon.

By way of illustration and not limitation, filler particles 162 comprises any of various Nickel-Zinc (Ni—Zn) alloys, permalloy materials, silicon (Si) steels, ferrites, amorphous alloys, iron (Fe) fillers—including an iron (Fe) alloy—and/or derivatives thereof. In some embodiments, filler particles 162 comprises a magnetic material including one or more of: Pt, Pd, W, Ce, Al, Li, Mg, Na, $Cr_2O_3$, CoO, Dy, $Dy_2O$, Er, $Er_2O_3$, Eu, $Eu_2O_3$, Gd, $Gd_2O_3$, FeO, $Fe_2O_3$, Nd, $Nd_2O_3$, $KO_2$, Pr, Sm, $Sm_2O_3$, Tb, $Tb_2O_3$, Tm, $Tm_2O_3$, V, $V_2O_3$. In various embodiments, filler particles 162 comprises a magnetic alloy formed (for example) of one or more of: Pt, Pd, W, Ce, Al, Li, Mg, Na, Cr, Co, Dy, Er, Eu, Gd, Fe, Nd, K, Pr, Sm, Tb, Tm, or V. In some embodiments, filler particles 162 exhibit non-insulating but magnetic properties—e.g., wherein filler particles 162 include one or more of: Heusler alloy, Co, Fe, Ni, Gd, B, Ge, Ga, permalloy, or Yttrium Iron Garnet (YIG), and wherein the Heusler alloy is a material which includes one or more of: Cu, Mn, Al, In, Sn, Ni, Sb, Ga, Co, Fe, Si, Pd, Sb, V, Ru, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$ $Co_2MnAl$, $Co_2MnSi$, $Co_2MnGa$, $Co_2MnGe$, $Pd_2MnAl$, $Pd_2MnIn$, $Pd_2MnSn$, $Pd_2MnSb$, $Co_2FeSi$, $Co_2FeAl$, $Fe_2VAl$, $Mn_2VGa$, $Co_2FeGe$, MnGa, MnGaRu, or $Mn_3X$, where 'X' is one of Ga or Ge.

A hole 190 extends in body 160 and, for example, through one or more layers of the substrate. In one such embodiment, various ones of filler particles 162 each extend to hole 190—e.g., wherein carrier material 161 leaves the various particles at least partially exposed. Inductor 150 further comprises a conductor 180 which extends along a surface formed by the hole 190 in body 160. By way of illustration and not limitation, conductor 180 comprises any of various suitable metals including one or more of copper (Cu), silver (Ag), gold (Au), nickel (Ni), tin (Sn), iron (Fe) and/or any of various alloys or other derivatives thereof. During operation of inductor 150, conductor 180 carries an electrical current to generate a magnetic flux with body 160.

In some embodiments, inductor 150 further comprises a passivation material 170—e.g., deposited by an eless process—which facilitates the formation of conductor 180 in hole 190. More particularly, passivation material 170 provides a material composition—different than that of conductor 180—which (for example) promotes a relatively steady rate of reaction as a metal of conductor 180 is formed in hole 190. In various embodiments, passivation material 170 comprises one of nickel (Ni), tin (Sn), copper (Cu), palladium (Pd), or gold (Au). In one such embodiment, passivation material 170 further comprises another constituent, such as phosphorous (P), which is provided in a suitable proportion to mitigate skin effect loss.

In various embodiments, passivation material 170 additionally or alternatively comprises any of various suitable inorganic nitrides including, but not limited to, titanium nitride (TiN), silicon nitride ($Si_3N_4$), or the like—e.g., wherein passivation material 170 comprises nitrogen (N), and one of titanium (Ti), or silicon (Si). Additionally or alternatively, passivation material 170 comprises any of a variety of suitable metal oxides such as aluminum oxide ($Al_2O_3$). In some embodiments, passivation material 170 additionally or alternatively comprises any of various suitable polymers, for example.

Some embodiments additionally or alternatively provide improved performance with one or more cleaner chemicals and/or activator chemicals to remove Fe oxide (for example) and/or any of various other inorganic or organic residues. By way of illustration and not limitation, some embodiments variously enhance Ni chemistry wettability on Fe particles by exposing them to an alkaline based cleaner and a hydrochloric acid (HCl) which, for example, has concentration in a range of 30%-40%.

In various embodiments, nucleation of passivation material 170 begins to form at the respective exposed surfaces of one or more of filler particles 162. The eless passivation (e.g., comprising Ni) enables controlled deposition on exposed Fe filler surfaces with relatively low plating time. In some embodiments, forming a thicker film with longer plating time provides continuous coverage of a passivation layer across a surface of a magnetic material—e.g., due to a direction of an isotropic eless Ni film growth. In one such embodiment, a thickness of a passivation layer is in a range of 0.5 microns (μm) to 10 μm—e.g., in a range of 0.75 μm to 5 μm (and, in some embodiments, in a range of 1 μm to 3 μm).

An eless Ni layer according to some embodiments provides strong adhesion (for example) of Ni to Fe fillers, and of eless Ni to eless Cu. Very uniform coverage is provided in some embodiments, for example, with high aspect ratio plated through hole (PTH) structures of an inductor. Embodiments support the tuning of magnetic property of a passivation layer by providing nickel (Ni) and phosphorous (P) in a ratio which mitigates skin effect loss.

In the example embodiment shown, passivation material 170 forms in hole 190 a continuous layer which extends both over some of filler particles 162 and over portions of carrier material 161. However, in other embodiments, passivation material 170 forms regions which are non-contiguous with each other—e.g., wherein passivation material 170 is deposited on surfaces of filler particles 162, but where at least some other surface regions of carrier material 161 are in direct contact with conductor 180. Additionally or alternatively, other portions of passivation material 170 (not shown) adjoin surfaces of filler particles 162 which are outside of hole 190—e.g., wherein one or more such portions variously extend horizontally (along the x-axis shown) over a top side of body 160, or extend horizontally under a bottom side of body 160.

In one example embodiment, for each of the two illustrative regions r1, r2 shown, a different respective portion of passivation material 170 is between body 160 and corresponding portion of conductor 180. Although some embodiments are not limited in this regard, another region r3 is between regions r1, r2 in the cross-sectional plane shown, wherein any portion of conductor 180 is outside of said region r3 (e.g., wherein region r3 is within hole 190).

In some embodiments, passivation material 170 is formed by atomic layer deposition (ALD) which, for example, provides in hole 190 a thin (e.g., in a range of 0.5 μm to 10 μm), high aspect ratio deposition of an organic isolation film or metallic seed. In alternative embodiments, a passivation material is formed by physical vapor deposition (PVD) to deposit a seed layer on a planar surface of a magnetic material which comprises particles similar to filler particles 162.

Figure 2:
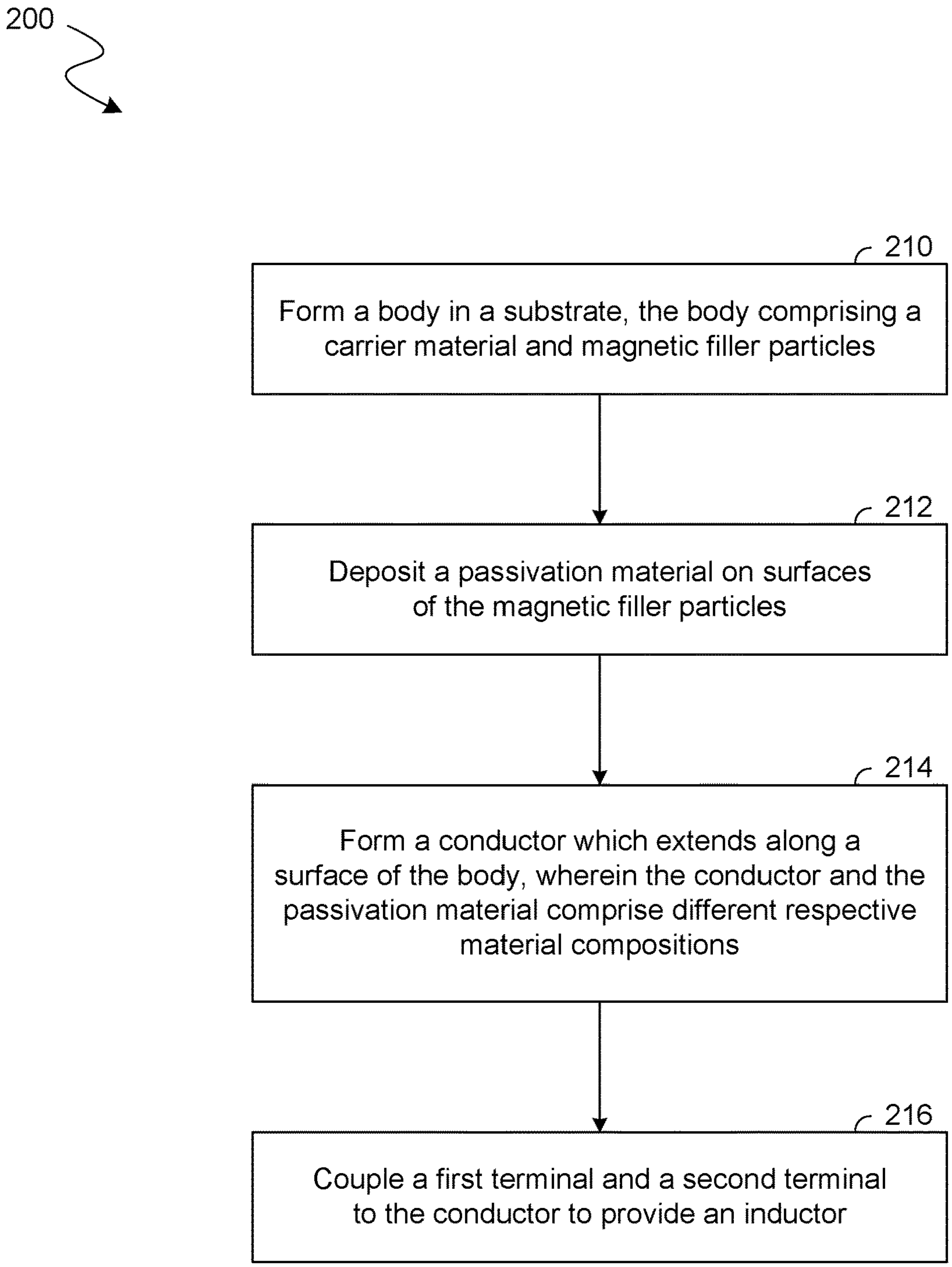
FIG. 2 illustrates a method to provide passivation structures of a magnetic material based inductor according to an embodiment.

FIG. 2 illustrates features of a method 200 to provide structures of an inductor in or on a substrate according to an embodiment. Method 200 is one example of an embodiment wherein a passivation material is provided between a conductor and filler particles of a magnetic material. In some embodiments, method 200 provides structures of device 100 and/or inductor 150, for example.

As shown in FIG. 2, method 200 comprises (at 210) forming, in a substrate, a body comprising a carrier material and magnetic filler particles. By way of illustration and not limitation, the magnetic filler particles comprise one of iron, nickel, zinc, or silicon—e.g., wherein the carrier material comprises one of an epoxy, a polymer resin, a rubber, or a ceramic. In one example embodiment, the forming at 210 comprises performing a lamination or other suitable deposition process to provide body 160 of inductor 150.

Method 200 further comprises (at 212) depositing a passivation material—such as passivation material 170—on surfaces of the magnetic filler particles. In some embodiments, the passivation material comprises one of nickel, tin, copper, palladium, or gold—e.g., wherein the depositing at 212 comprises an eless deposition process. In other embodiments, the passivation material comprises one of an inorganic nitride, a metal oxide, or a polymer.

After the depositing at 212, method 200 (at 214) forms a conductor—such as conductor 180—which extends along a surface of the body. For example, the forming at 214 comprises an immersion deposition of copper (Cu) or other suitable conductive material. The conductor and the passivation material comprise different respective material compositions—e.g., wherein the conductor comprises one or more of copper (Cu), silver (Ag), gold (Au), nickel (Ni), tin (Sn), or iron (Fe). In various embodiments, after the forming at 214, at least a portion of the passivation material is adjacent to both the conductor and the magnetic filler particles of the body. In one such embodiments, the passivation material forms a layer which further extends to adjoin portions of the carrier material.

Method 200 further comprises (at 216) coupling a first terminal and a second terminal to the conductor to provide an inductor. For example, one or more additional metallization processes are performed to form pins, pads, vias, pillars and/or other suitable contact structures in or on the substrate—e.g., wherein such contact structures facilitate coupling of the inductor, directly or indirectly, to a current source and to a current sink.

In various embodiments, in a first region of the inductor, a first portion of the passivation material is between the body and a second portion of the conductor. In one such embodiment, in a second region of the inductor, a third portion the passivation material is between the body a fourth portion of the conductor—e.g., wherein any portion of the conductor is outside of a third region located between the first region and the second region.

By way of illustration and not limitation, method 200 is to provide an inductor comprising a PTH via, in some embodiments. For example, forming the body at 210 comprises forming a hole which extends through the body—e.g., wherein the conductor extends in the hole, and the third region is in the hole. In one such embodiment, the conductor is a first conductor of a first PTH via—e.g., wherein method 200 further comprises additional operations (not shown) to similarly form a second PTH via of the inductor. Such additional operations comprise (for example) forming in the substrate a second body which comprises the carrier material and second magnetic filler particles, and depositing a second passivation material on surfaces of the second magnetic filler particles. After depositing the second passivation material, the additional operations form a second conductor which extends along a surface of the second body—e.g., wherein the second passivation material is adjacent to the second conductor and to the second magnetic filler particles. In one such embodiment, the coupling at 216 comprises coupling the first conductor and the second conductor in series with each other between the first terminal and the second terminal.

In some embodiments, method 200 is to additionally or alternatively provide a planar inductor—e.g., wherein the body forms at least in part a side of a layer of the substrate. In one such embodiment, the conductor is on said side of the substrate layer (and, for example, forms one or more serpentine structures on said side).

Figure 3A:
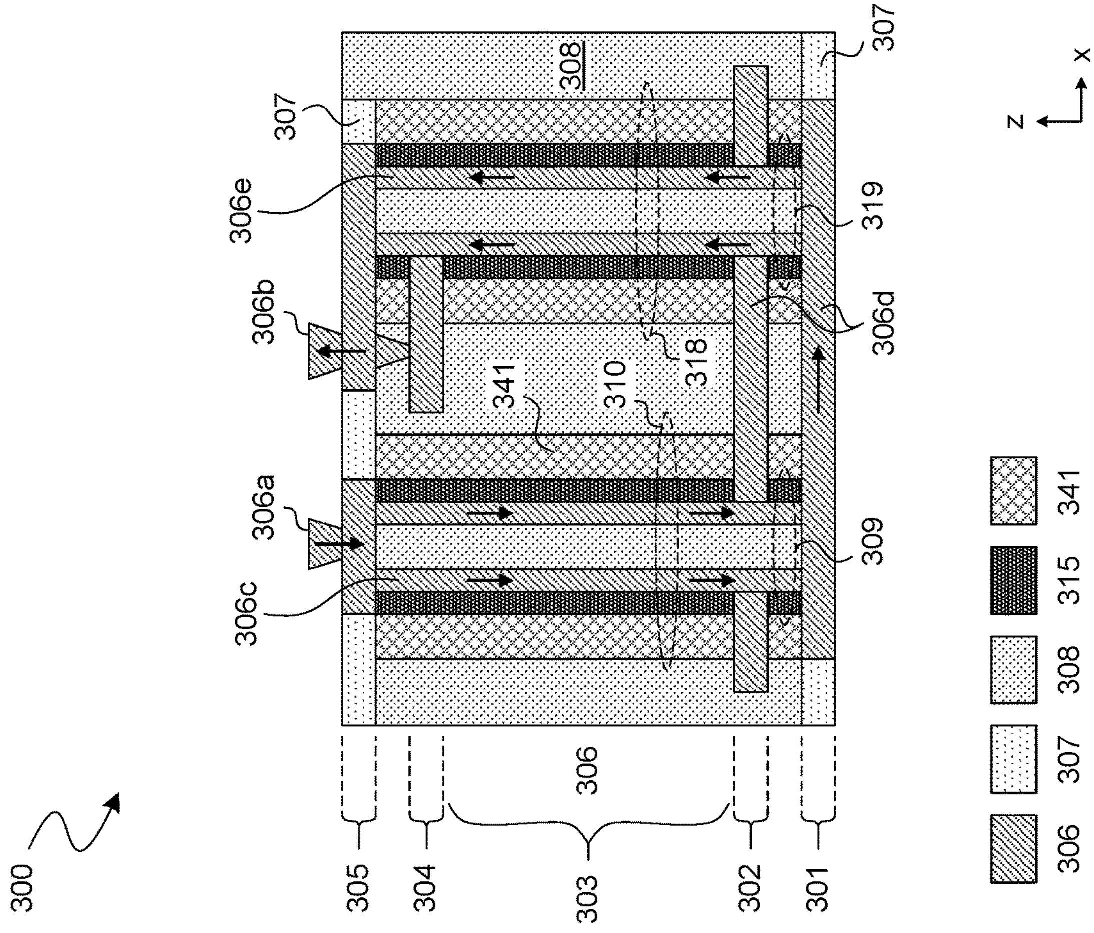
FIGS. 3A, 3B illustrate a cross-section and a 3D view, respectively, of a magnetic material based inductor using PTH vias in accordance with some embodiments.
Figure 3B:
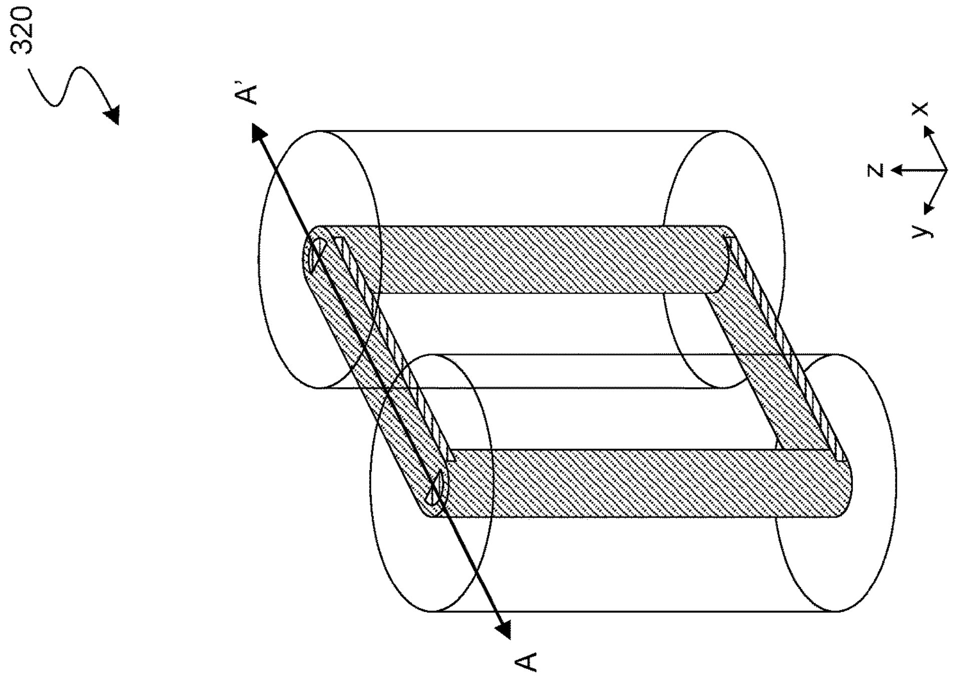
Figure 4A:
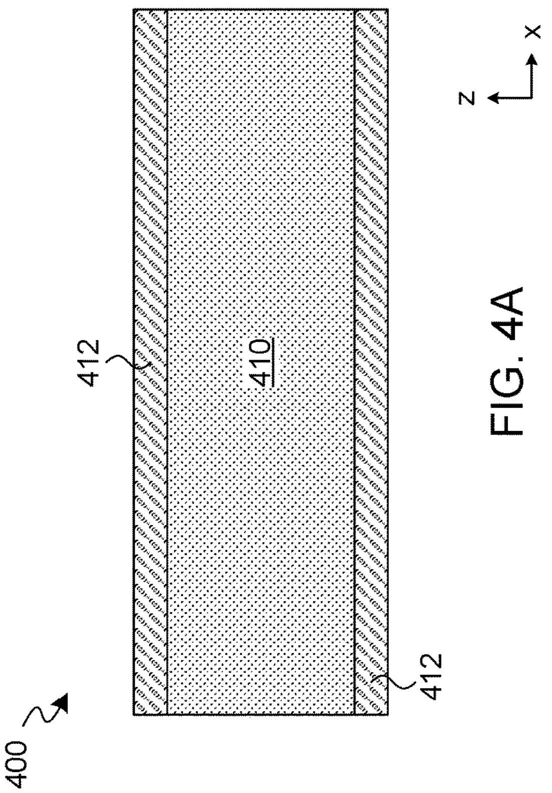
FIGS. 4A-4H illustrate a process flow for fabricating a magnetic material based inductors with selective PTH wall plating, in accordance with some embodiments.
Figure 4B:
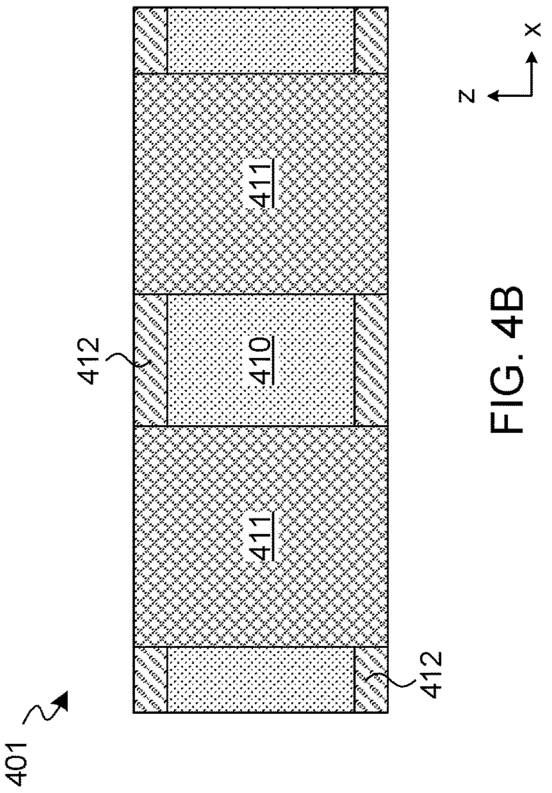
Figure 4C:
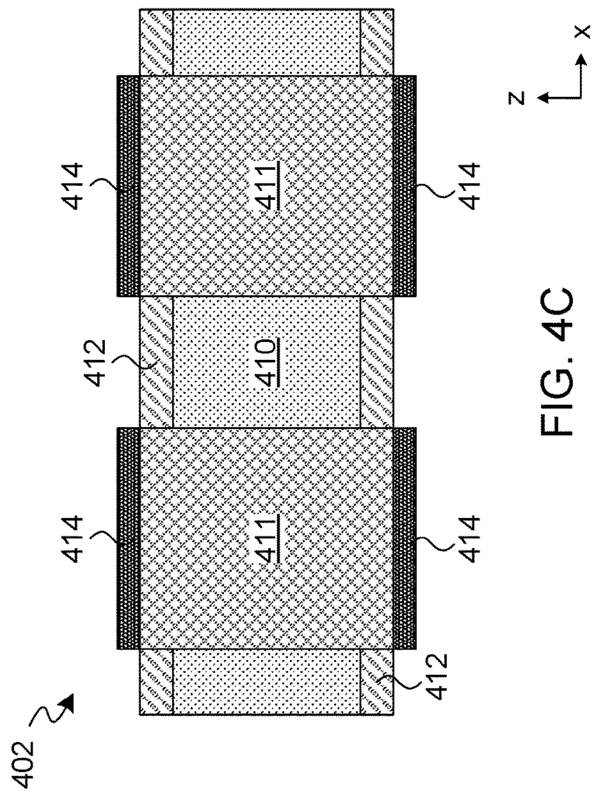
Figure 4D:
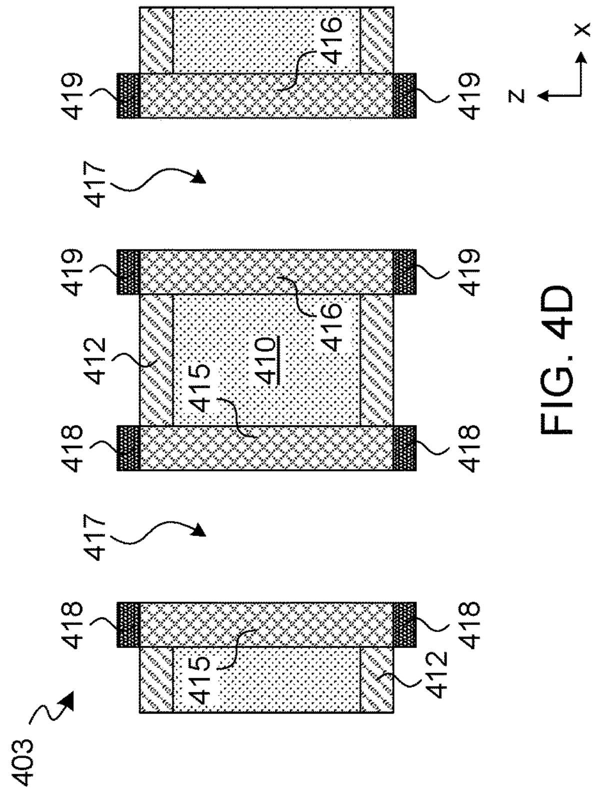
Figure 4E:
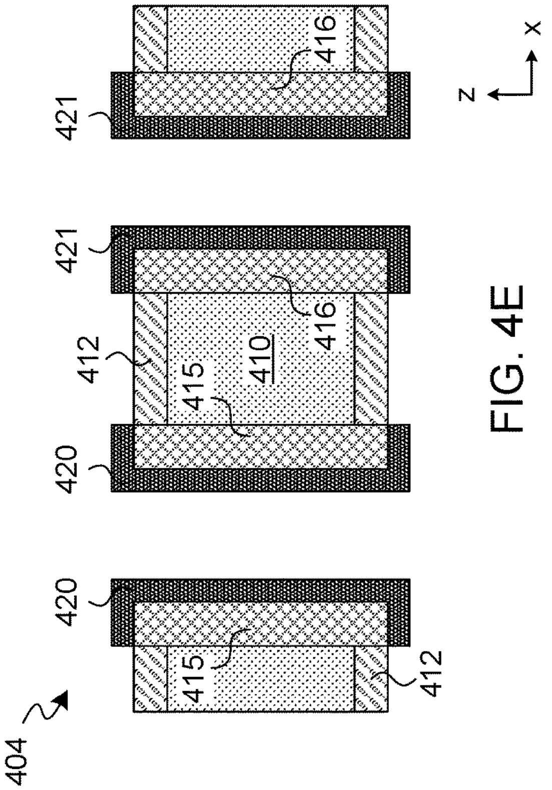
Figure 4F:
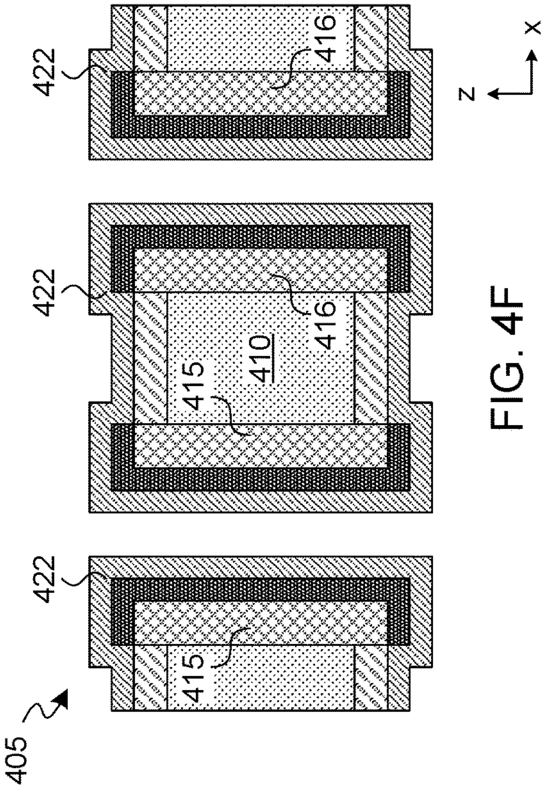
Figure 4G:
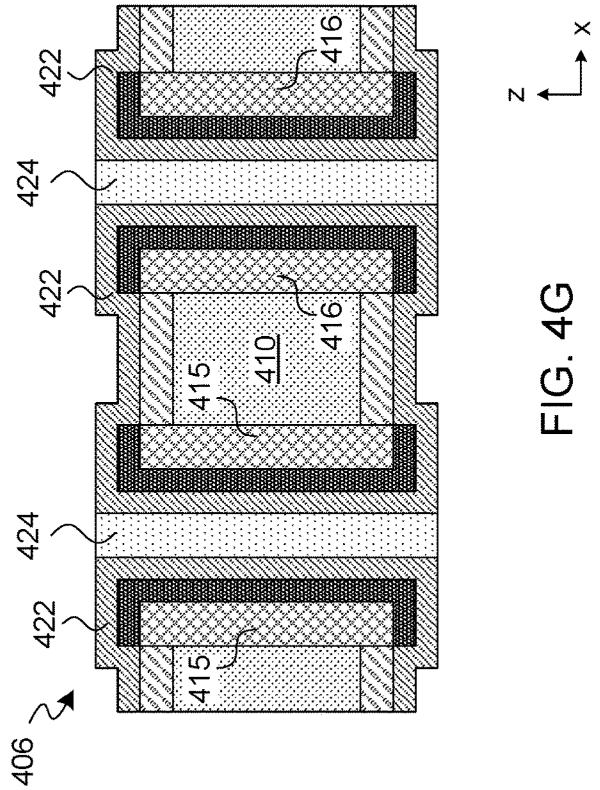
Figure 4H:
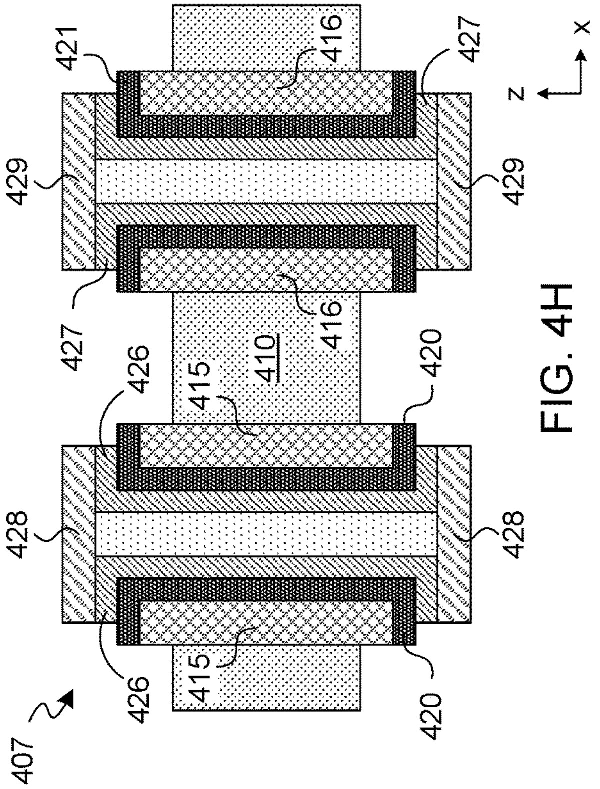

FIG. 3A illustrates a cross-sectional view of a device 300 comprising an inductor which includes plate-through-hole (PTH) vias according to an embodiment. FIG. 3B illustrates a three-dimensional (3D) view 320 of device 300. More particularly, FIG. 3A illustrates a cross-section along the line A-A' shown in view 320. In some embodiments, device 300 includes features of inductor 150, and/or features of an inductor indicated by one of reference numbers 118, 119—e.g., wherein some or all structures of device 300 are provided by operations of method 200.

In this example, a five-layer substrate is used to fabricate a PTH inductor. The first layer 301 shown is, for example, a second backside of core (2BCO) layer—e.g., wherein the second layer 302 shown is a first backside of core (1BCI) layer, the third layer 303 is the core layer, the fourth layer is the first front side of core (1FCI) layer, and the fifth layer 305 is the second front side of core (2FCO) layer. The general label for conductors or non-magnetic conducting material is 306, the general label for lamination layer is 307, the general label for a dielectric or substrate is 308, the general label for passivation structures is 315, and the general label for magnetic material is 341.

In various example embodiments, the conducting material 306 includes one or more of: Cu, Al, Au, Ag, Co, Graphene, or W. Although some embodiments are not limited in this regard, layer 307 is a lamination layer to protect the structural integrity of the PTH inductor and to facilitate conducting material plating on its surface. In various embodiments, layer 307 is a thermoplastic and/or thermosetting polymer. For example, composite epoxies, liquid crystalline polymers, polyimide, mold film, or ABF (Ajinomoto Build-up Film) can be used for layer 307. Other similar lamination materials can be used. Substrate or dielectric 308 can be any material commonly used in an integrated circuit package. For example, organic or inorganic material can be used for substrate 308. Examples of substrate 308 include FR4 (e.g., epoxy based laminate), bismaleimide-triaxine, polyimide, silicon, etc.

In some embodiments, PTH vias 309, 319 are formed through substrate 308. Although some embodiments are not limited in this regard, PTH vias 309, 319 in this example are filled with substrate material within respective ones of conductors 306*c*, 306*e*. Conductors 306*c*, 306*e* extend along the z-axis (which is also the width of the cross-section). The PTH vias 309, 319 are coupled together by conductors 306*d* which are orthogonal (e.g., perpendicular) to conductors 306*c*, 306*e*. Conductors 306*d* are variously formed each in a respective one of layers 301, 302. The two conductive terminals of the PTH inductor are 306*a* and 306*b*, wherein conductors 306*c*, 306*e* are coupled in series between terminals 306*a*, 306*b*. In some embodiments, conducting terminal 306*a* is for coupling to one or more transistors (e.g., high-side and low-side switches or bridge). In some embodiments, conducting terminal 306*b* is for coupled to a capacitor (e.g., capacitor for a regulator). The arrows in the conducting layers 306 show the direction of currents, according to one example.

In the example embodiment show, an inductor structure 310 of device 300 comprises a first portion of magnetic material 341 and conductor 306*c*, which extends in a first hole formed at least partially through the first portion of magnetic material 341. Inductor structure 310 further comprises a portion of lamination layer 307 which is disposed between, and adjoins, each of conductor 306*c* and the first portion of magnetic material 341. In one such embodiment, magnetic material 341, conductor 306*c*, and lamination layer 307 correspond functionally to—and include features of—body 160, conductor 180, and passivation material 170 (respectively). Lamination layer 307 is formed on a surface of magnetic material 341 (e.g., via an eless deposition process) to facilitate a plating of PTH via 309 to form conductor 306*c*.

Additionally or alternatively, an inductor structure 318 of device 300 comprises a second portion of magnetic material 341 and conductor 306*e*, which extends in a second hole formed at least partially through the second portion of magnetic material 341. Inductor structure 318 further comprises another portion of lamination layer 307 which is disposed between, and adjoins, each of conductor 306*e* and the second portion of magnetic material 341. In one such embodiment, magnetic material 341, conductor 306*e*, and lamination layer 307 correspond functionally to body 160, conductor 180, and passivation material 170 (respectively).

FIGS. 4A through 4H illustrate respective cross-sectional side views 400 through 407 each corresponding to a respective stage of a process for fabricating a magnetic material based inductor with a passivation material, in accordance with some embodiments. For example, fabrication processing such as that illustrated by views 400 through 407 is to provide features of inductor 150, device 300, or an inductor indicated by one of reference numbers 118, 119—e.g., wherein some or all such processing is according to method 200.

View 400 illustrates a substrate 410 (e.g., core of a multi-layer package) with conductive material 412 deposited on its top and bottom surfaces. A person skilled in the art would appreciate that many different mechanisms can be used to deposit conductive layers 412 below and above substrate 410. View 401 illustrates the case after drilling forms holes or trenches, into which are deposited respective portions of a high permeability magnetic material 411. Any suitable drilling technique can be used to form such holes or trenches. In this example two holes are formed. However, any number of holes may be drilled according to the number of desired inductor structures.

In some embodiments, material 411 comprises a carrier material, and magnetic filler particles which are disposed in said carrier material. In one such embodiment, the carrier material comprises an epoxy, a rubber, a ceramic, a polymer resin and/or any of various other suitable materials. In various embodiments, filler particles of material 411 exhibit magnetic properties and (for example) comprise one of a paramagnet or a ferromagnet. In one such embodiment, the filler particles comprise one of iron, nickel, zinc, or silicon. By way of illustration and not limitation, such filler particles comprises any of various Nickel-Zinc (Ni—Zn) alloys, permalloy materials, silicon (Si) steels, ferrites, amorphous alloys, iron (Fe) fillers—including an iron (Fe) alloy—and/or derivatives thereof. In some embodiments, magnetic material 411 comprises one of a paramagnet or a ferromagnet, and includes one or more of: Pt, Pd, W, Ce, Al, Li, Mg, Na, $Cr_2O_3$, CoO, Dy, $Dy_2O$, Er, $Er_2O_3$, Eu, $Eu_2O_3$, Gd, $Gd_2O_3$, FeO, $Fe_2O_3$, Nd, $Nd_2O_3$, $KO_2$, Pr, Sm, $Sm_2O_3$, Tb, $Tb_2O_3$, Tm, $Tm_2O_3$, V, $V_2O_3$ or epoxy material with particles of a magnetic alloy. A magnetic alloy can be an alloy formed of one or more of: Pt, Pd, W, Ce, Al, Li, Mg, Na, Cr, Co, Dy, Er, Eu, Gd, Fe, Nd, K, Pr, Sm, Tb, Tm, or V. In some embodiments, material 411 exhibit non-insulating but magnetic properties, and wherein the material includes one or more of: Heusler alloy, Co, Fe, Ni, Gd, B, Ge, Ga, permalloy, or Yttrium Iron Garnet (YIG), and wherein the Heusler alloy is a material which includes one or more of: Cu, Mn, Al, In, Sn, Ni, Sb, Ga, Co, Fe, Si, Pd, Sb, V, Ru, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$ $Co_2MnAl$, $Co_2MnSi$, $Co_2MnGa$, $Co_2MnGe$, $Pd_2MnAl$, $Pd_2MnIn$, $Pd_2MnSn$, $Pd_2MnSb$, $Co_2FeSi$, $Co_2FeAl$, $Fe_2VAl$, $Mn_2VGa$, $Co_2FeGe$, MnGa, MnGaRu, or $Mn_3X$, where 'X' is one of Ga or Ge.

View 402 illustrates the formation of layers 414 of a passivation material on respective top and bottom surfaces of the plugs of magnetic material 411—e.g., wherein layers 414 are formed by eless deposition through a patterned mask (not shown). The passivation material of layers 414 facilitates subsequent deposition of one or more conductive materials along a surface of a magnetic structure formed from magnetic material 411—e.g., wherein said passivation material comprises one of nickel (Ni), tin (Sn), copper (Cu), palladium (Pd), or gold (Au). In one such embodiment, the passivation material further comprises another constituent, such as phosphorous (P), which is provided—e.g., in a suitable proportion relative to nickel (Ni)—to mitigate skin effect loss.

For example, view 403 illustrates a stage after drilling or other subtractive processing is performed to provide holes 417 though the layers of passivation material 414, and through the portions of magnetic material 411, thereby forming passivation structures 418, 419 from the layers of passivation material 414, as well as forming magnetic structures 415, 416 from the magnetic material 411. In various embodiments, an amount of inductance to be provided by the resulting device depends on the thickness of the magnetic structures 415, 416 after holes 417 are formed.

View 404 illustrates the formation of passivation structures 420, 421 which each adjoin a respective one of magnetic structures 415, 416. In some embodiments, passivation structures 420, 421 are formed by an additional eless (or other) depositing of the passivation material—e.g., through a patterned mask (not shown)—into holes 417 and onto both passivation structures 418, 419 and exposed portions of magnetic structures 415, 416. For example, the passivation material is deposited onto the exposed surfaces of filler particles at the sides of magnetic structures 415, 416 which adjoin holes 417.

View 405 illustrates a process stage after passivation structures 420, 421 (and, in some embodiments, portions of magnetic structures 415, 416 which remain exposed in holes 417) are plated with a conductive material 422. In view 405, passivation structures 420, 421 are variously sandwiched each between conductive material 422 and a respective one of magnetic structures 415, 416.

View 406 illustrates a process stage after a dielectric 424 is deposited, through a patterned mask (not shown), into remaining portions of holes 417. Subsequently, as illustrated in view 407, additional metallization and patterning is performed to provide a PTH conductor 426 which adjoins passivation structure 420. Such metallization and patterning further provides conductors 428 which (for example) are to function as respective terminals for coupling a first inductor structure which includes magnetic structure 415, passivation structure 420, and conductive structure 426. Alternatively or in addition, such metallization and patterning provides a PTH conductor 427 which adjoins passivation structure 421. Such metallization and patterning further provides conductors 429 which (for example) are to function as respective terminals for coupling a second inductor structure which includes magnetic structure 416, passivation structure 421, and conductive structure 427.

Figure 5:
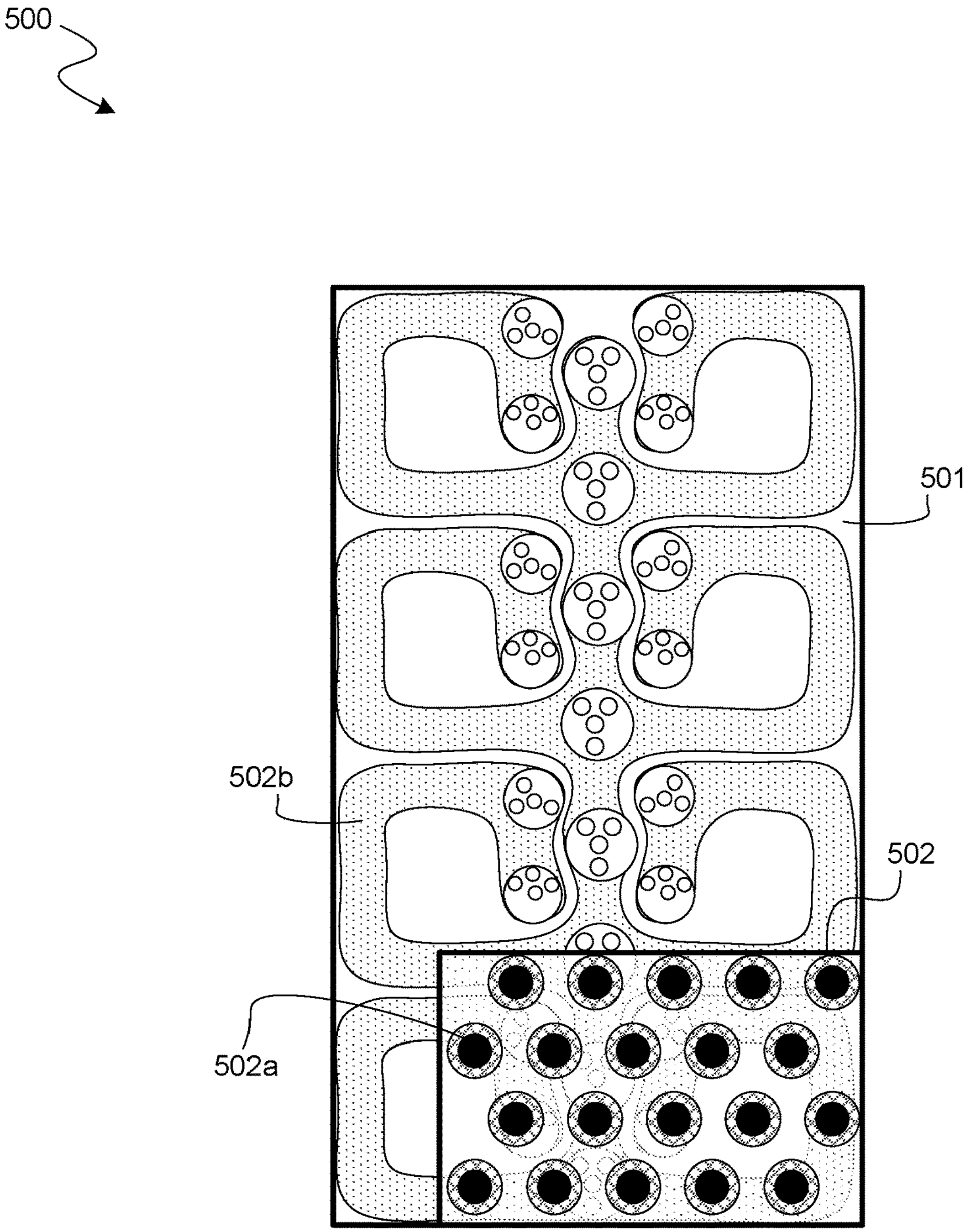
FIG. 5 illustrates a top view of a package with a magnetic material based inductor compared with air core inductors, according to some embodiments.

FIG. 5 illustrates a top view of a package 500 with coaxial magnetic material based inductors 502*a* according to some embodiments. Coaxial magnetic material based inductors 502*a* are in an area 502 of package 500 which is shown in comparison to another area 501 which, for example, would alternatively accommodate the illustrative air core inductors (ACIs) 502*b* shown. In various embodiments, coaxial magnetic material based inductors 502*a* are much smaller than ACIs 502*b*. As such, in this example, 10 coaxial magnetic material based inductors can be packed in an area 502 of package 500, as compared to a larger area 501 being able to alternatively accommodate just 8 inductors loops of ACIs 502*b*. In the example embodiments shown, area 501 is about 4 times larger than area 502. Accordingly, 40 coaxial magnetic material based inductors can be fit into area 501, for example. The coaxial magnetic material based inductors 502*a* allow for implementing high performance and smaller integrated voltage regulators. In various embodiments, package 500 includes features of device 100—e.g., wherein one or more of coaxial magnetic material based inductors 502*a* are provided according to method 200.

FIGS. 6A-6F show cross-sectional side views of respective stages 600-605 during an exemplary process for fabricating a planar inductor structure with a passivation material according to another embodiments. For example, fabrication processing such as that comprising stages 600-605 includes features of method 200—e.g., wherein such processing is to provide one of magnetic inductor 118, or magnetic inductor module 119.

Figure 6A:
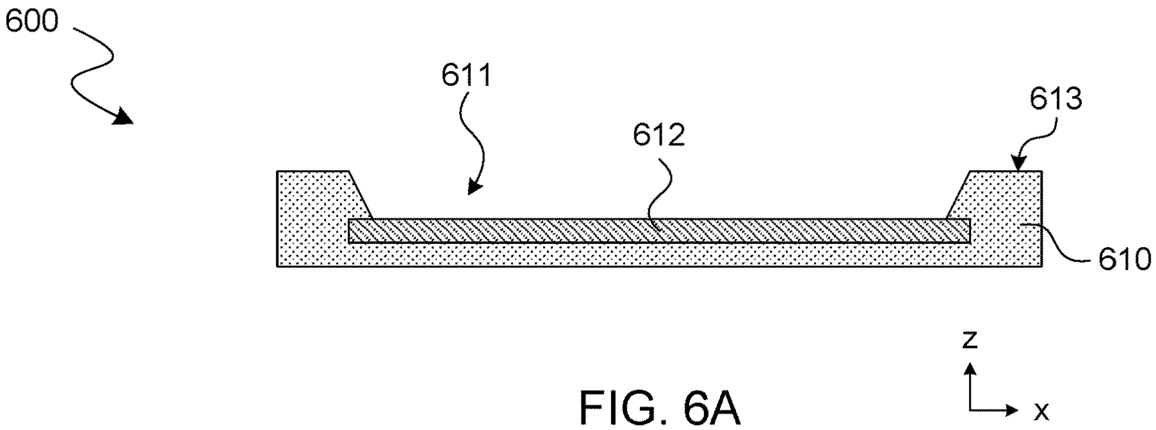
FIGS. 6A-6G illustrate cross-sectional views of an exemplary fabrication method for fabricating an inductor having an organic magnetic film embedded within a substrate, according to some embodiments.

In the stage 600 shown in FIG. 6A, a substrate 610 (e.g., that of interposer 105, or package substrate 104) is received in a partially completed state. In the illustrated embodiment, substrate 610 is received with metallization structures formed in previous operations, which are not shown and are not limiting on some embodiments. By way of illustration and not limitation, a metallization layer of substrate 610 comprises a conductor 612, at least a portion of which is exposed by a recess 611 that is drilled, etched or otherwise formed in a side 613 of substrate 610. For simplicity, only one such metallization layer is shown at stage 600, however, it is understood that in some embodiments, substrate 610 further comprises any of various combinations of one or more dielectric layers, one or more other metallization layers, a core and/or other structures which, for example, are adapted from conventional substrate designs.

Figure 6B:
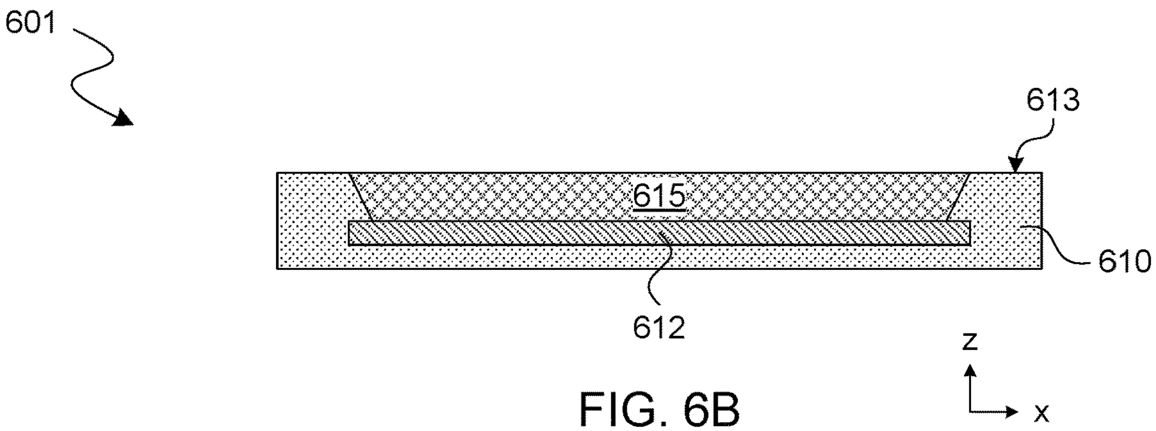

At the stage 601 shown in FIG. 6B, a magnetic material 615 is laminated or otherwise deposited in recess 611—e.g., wherein magnetic material 615 is formed on conductor 612, and/or wherein a top surface of magnetic material 615 forms at least a portion of side 613. In one such embodiment, magnetic material 615 has features of magnetic structure 160, magnetic material 341, magnetic structure 415, or magnetic structure 416—e.g., wherein magnetic material 615 comprises a carrier material and filler particles distributed in said carrier material.

Figure 6C:
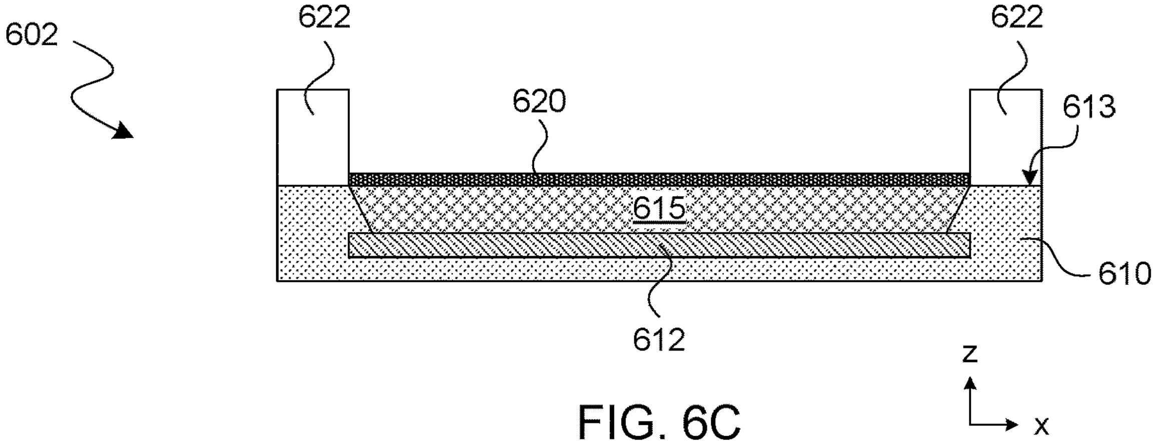

At the stage 602 shown in FIG. 6C, a passivation material 620 is deposited on magnetic material 615 to facilitate later metal deposition processing—e.g., wherein passivation material 620 corresponds functionally to magnetic structure 160. In one example embodiment, passivation material 620 is deposited by an eless process through a patterned mask 622—e.g., wherein passivation material 620 is deposited at least on exposed filler particles of magnetic material 615.

Figure 6D:
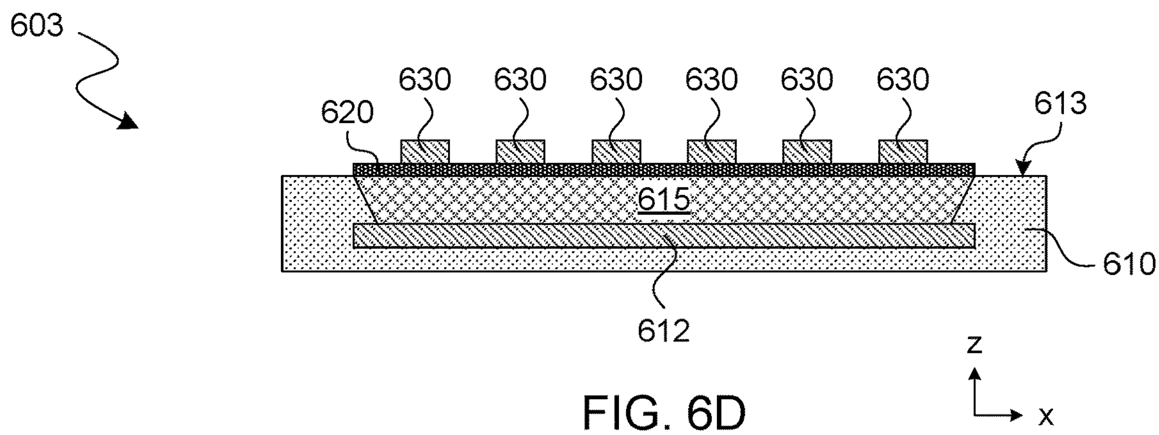

For example, at the stage 603 shown in FIG. 6D, subsequent patterned metallization results in the formation of a conductor 630 which extends along side 613 and adjoins passivation material 620. In the example embodiment shown, conductor 630 forms one or more bends, curves and/or other serpentine structures along the side 613 (as illustrated in by the top-side view shown in FIG. 6G). Conductor 630 has a material composition different than that of conductor 612—e.g., wherein conductor 630 has features of conductor 180, conductor 306*c*, conductor 306*e*, conductive structure 426, or conductive structure 427.

Figure 6E:
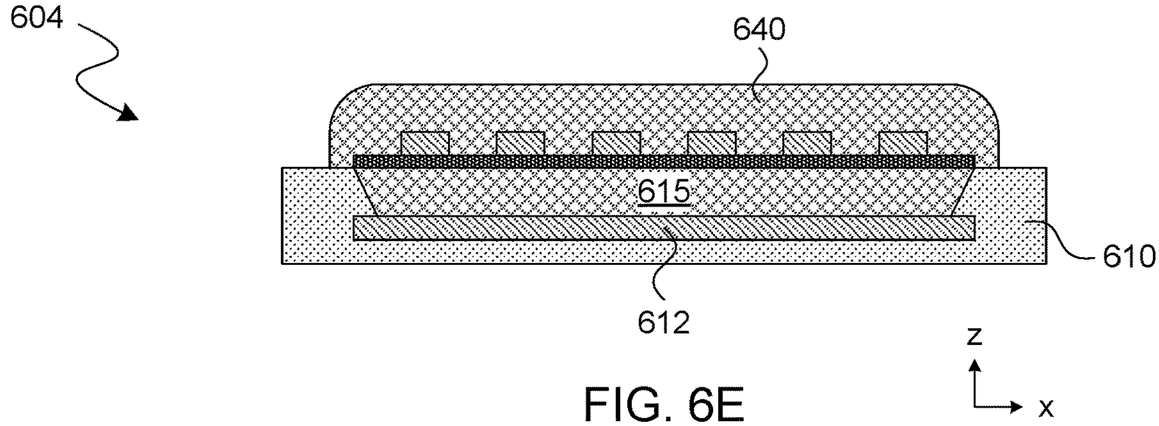
Figure 6F:
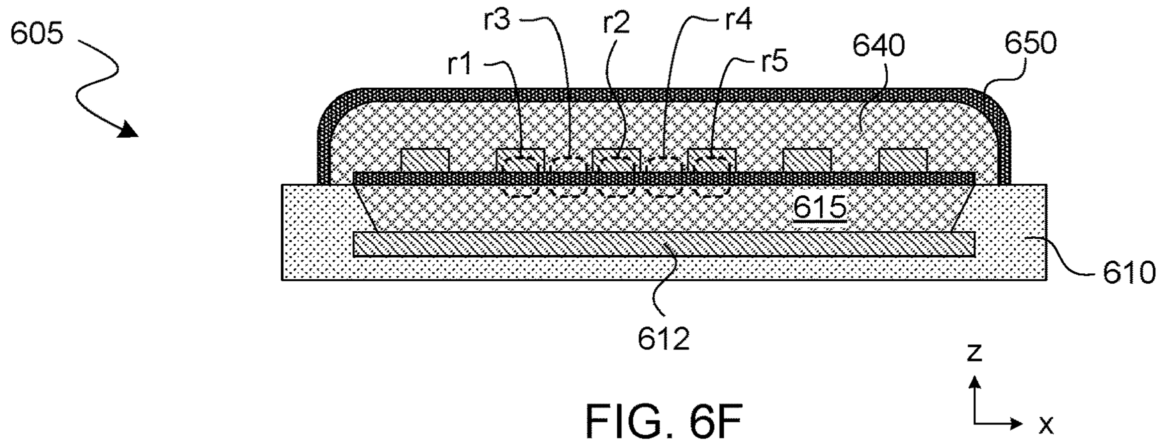

At the stage 604 shown in FIG. 6E—after formation of conductor 630 on passivation material 620—an additional body 640 of magnetic material is deposited on conductor 630. Subsequently, at the stage 605 shown in FIG. 6F, another portion 650 of the passivation material is deposited on body 640—e.g., wherein portion 650 facilitates subsequent metallization processing (not shown) for electrical coupling of the inductor structures shown.

Figure 6G:
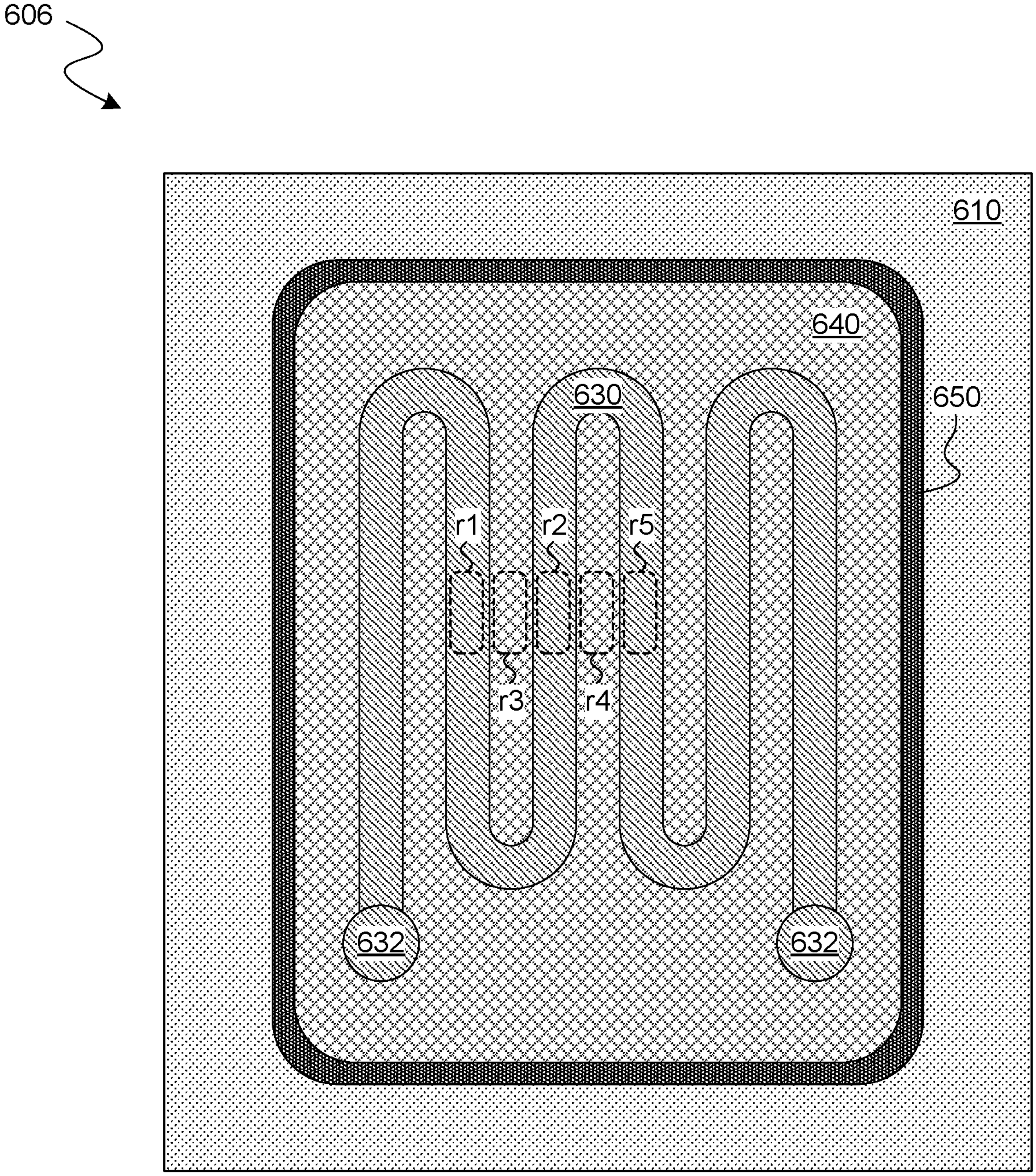

FIG. 6G shows a cross-sectional top view of a planar inductor 606 which is formed by the processing illustrated by stages 600-605. As variously shown in FIG. 6F, the conductor 630 of inductor 606 forms serpentine structures which repeatedly intersect the cross-sectional plane represented (for example) in FIG. 6G. In one such embodiment, conductor 630 extends between two terminals 632 which facilitate coupling of the planar inductor 606 to other circuitry—e.g., including circuitry of IVR 120 or other such circuitry of device 100.

As shown by FIG. 6G, in the region r1, a first portion of passivation material 620 is between the body of magnetic material 615 and a second portion of conductor 630—e.g., where, in a region r2, a third portion passivation material 620 is between the body of magnetic material 615 and a fourth portion of conductor 630. However, any portion of conductor 630 is outside of a region r3 between region r1 and region r2. Furthermore, in a region r5, a fifth portion of passivation material 620 is between the body of magnetic material 615 and a sixth portion of conductor 630, wherein region r2 is between region r3 and region r5. However, any portion of conductor 630 is outside of a region r4 between region r2 and region r5.

Figure 7:
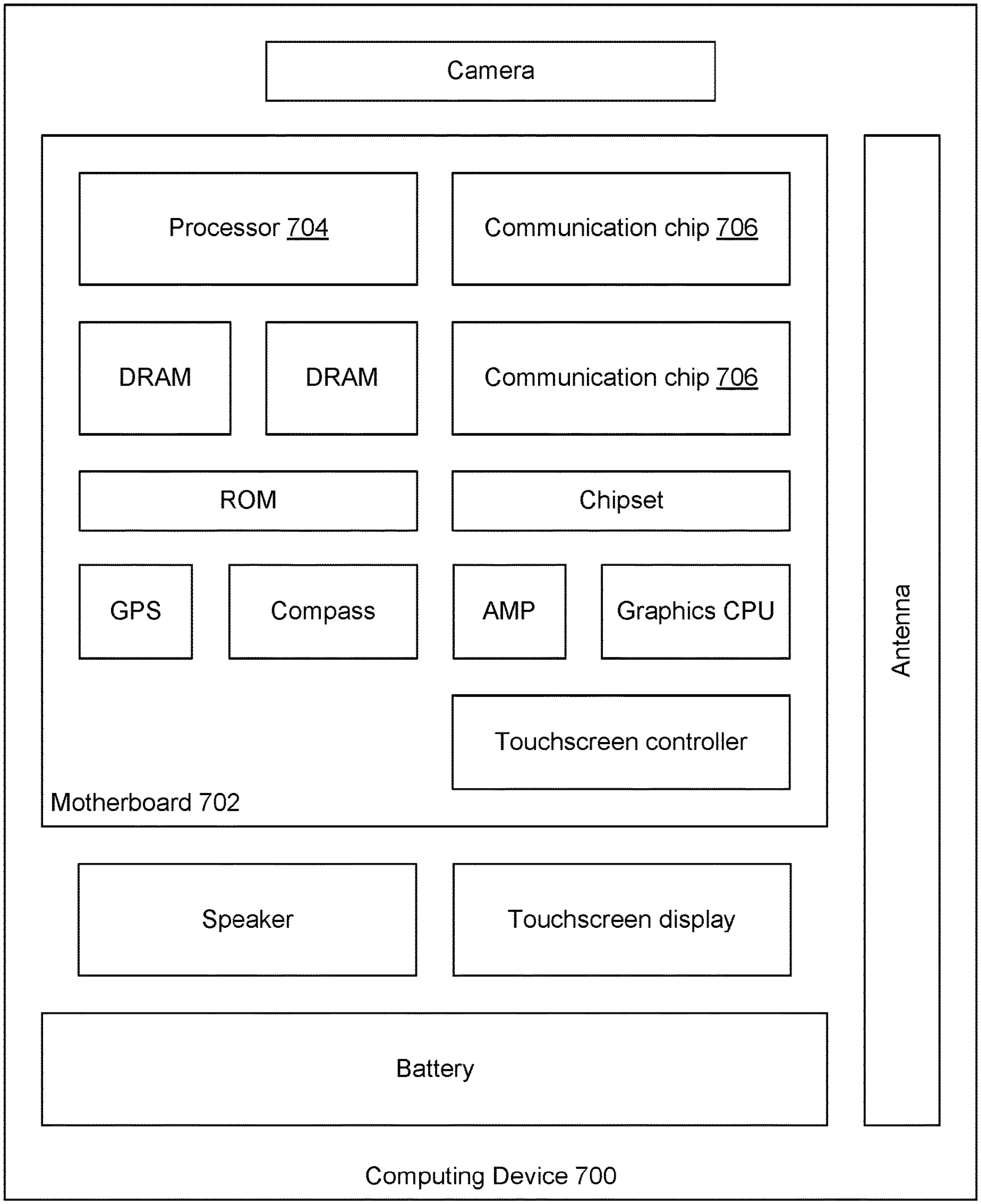
FIG. 7 is a functional block diagram illustrating a computing device in accordance with one embodiment.

FIG. 7 illustrates a computing device 700 in accordance with one embodiment. The computing device 700 houses a board 702. The board 702 may include a number of components, including but not limited to a processor 704 and at least one communication chip 706. The processor 704 is physically and electrically coupled to the board 702. In some implementations the at least one communication chip 706 is also physically and electrically coupled to the board 702. In further implementations, the communication chip 706 is part of the processor 704.

Depending on its applications, computing device 700 may include other components that may or may not be physically and electrically coupled to the board 702. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 706 enables wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

The processor 704 of the computing device 700 includes an integrated circuit die packaged within the processor 704. The term "processor" may refer to any device or portion of a device that processes electronic data from registers and/or memory to transform that electronic data into other electronic data that may be stored in registers and/or memory. The communication chip 706 also includes an integrated circuit die packaged within the communication chip 706.

In various implementations, the computing device 700 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 700 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 8:
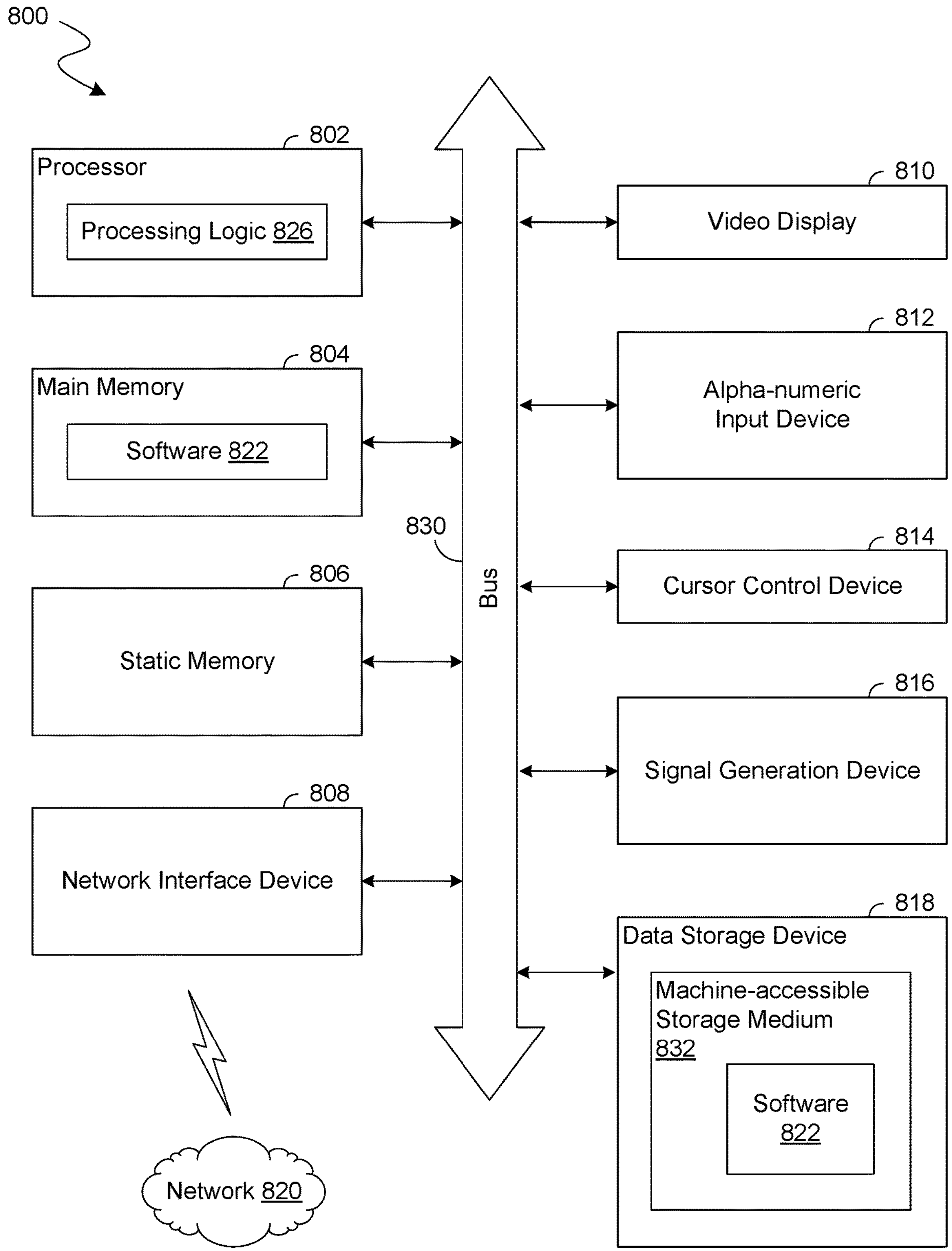
FIG. 8 is a functional block diagram illustrating an exemplary computer system, in accordance with one embodiment.

FIG. 8 illustrates a diagrammatic representation of a machine in the exemplary form of a computer system 800 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations described herein.

The computer system 800 may further include a network interface device 808. The computer system 800 also may include a video display unit 810 (e.g., a liquid crystal display (LCD), a light emitting diode display (LED), or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-accessible storage medium (or more specifically a computer-readable storage medium) 832 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface device 808.

While the machine-accessible storage medium 832 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Techniques and architectures for providing structures of an inductor are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:

a first body in a substrate, the first body comprising a carrier material and first magnetic filler particles;

a first conductor which extends along a surface of the first body; and a first material adjacent to the first conductor and to the first magnetic filler particles, wherein the first conductor and the first material comprise different respective material compositions; and a first terminal and a second terminal coupled to the first conductor such that an inductor is formed;

wherein:

the first magnetic filler particles comprise iron;

the first material comprises phosphorous and nickel; and the first conductor comprises copper.

2. The device of claim 1, wherein the first material further comprises one of an inorganic nitride, a metal oxide, or a polymer.

3. The device of claim 1, wherein:

in a first region, a first portion of the first material is between the first body and a second portion of the first conductor;

in a second region, a third portion of the first material is between the first body and a fourth portion of the first conductor; and any portion of the first conductor is outside of a third region between the first region and the second region.

4. The device of claim 3, wherein a first hole extends through the first body, wherein the first conductor extends in the first hole, and wherein the third region is in the first hole.

5. The device of claim 4, further comprising:

a second body in the substrate, the second body comprising the carrier material and second magnetic filler particles, wherein a second hole extends through the second body;

a second conductor which extends in the second hole, wherein the first conductor and the second conductor are coupled in series with each other between the first terminal and the second terminal; and a second material adjacent to the second conductor and to the second magnetic filler particles, wherein the second conductor and the second material comprise different respective material compositions, wherein the second material comprises one of nickel, tin, copper, palladium, or gold; and wherein:

in a fourth region, a fifth portion of the second material is between the second body and a sixth portion of the second conductor;

in a fifth region, a seventh portion of the second material is between the second body and an eighth portion of the second conductor; and any portion of the second conductor is outside of a sixth region between the fourth region and the fifth region.

6. The device of claim 3, wherein:

the first body forms at least in part a first side of a layer of the substrate;

the first conductor is on the first side; and the first side extends through the first region, the second region, and the third region.

7. The device of claim 6, wherein:

in a fourth region, a fifth portion of the first material is between the first body and a sixth portion of the first conductor;

the second region is between the third region and the fourth region; and any portion of the first conductor is outside of a fifth region between the second region and the fourth region.

8. The device of claim 1, wherein the carrier material comprises one of a polymer resin, a rubber, or a ceramic.

9. A package comprising:

a first die;

a second die coupled to the first die;

a substrate coupled to the first die, wherein the substrate comprises:

a plurality of layers of conductive material and dielectric, wherein at least one of the layers of the plurality is adjacent to the substrate, wherein a region of the plurality of layers includes:

a first body comprising a carrier material and first magnetic filler particles;

a first conductor which extends along a surface of the first body; and a first material adjacent to the first conductor and to the first magnetic filler particles, wherein the first conductor and the first material comprise different respective material compositions; and a first terminal and a second terminal coupled to the first conductor such that an inductor is formed;

wherein:

the first magnetic filler particles comprise iron;

the first material comprises phosphorous and nickel; and the first conductor comprises copper.

10. The package of claim 9, wherein the first material further comprises one of an inorganic nitride, a metal oxide, or a polymer.

11. The package of claim 9, wherein:

in a first region, a first portion of the first material is between the first body and a second portion of the first conductor;

in a second region, a third portion of the first material is between the first body and a fourth portion of the first conductor; and any portion of the first conductor is outside of a third region between the first region and the second region.

12. The package of claim 9, wherein the carrier material comprises one of a polymer resin, a rubber, or a ceramic.

13. A method comprising:

forming in a substrate a first body comprising a carrier material and first magnetic filler particles, wherein the first magnetic filler particles comprise iron;

depositing a first material on surfaces of the first magnetic filler particles, wherein the first material comprises phosphorous and nickel;

after depositing the first material, forming a first conductor which extends along a surface of the first body, wherein the first material is adjacent to the first conductor and to the first magnetic filler particles, wherein the first conductor and the first material comprise different respective material compositions, and wherein the first conductor comprises copper; and coupling a first terminal and a second terminal to the first conductor to provide an inductor.

14. The method of claim 13, wherein the first material further comprises one of an inorganic nitride, a metal oxide, or a polymer.

15. The method of claim 13, wherein:

in a first region, a first portion of the first material is between the first body and a second portion of the first conductor;

in a second region, a third portion of the first material is between the first body and a fourth portion of the first conductor; and any portion of the first conductor is outside of a third region between the first region and the second region.

* * * * *